Figures 1, 2:
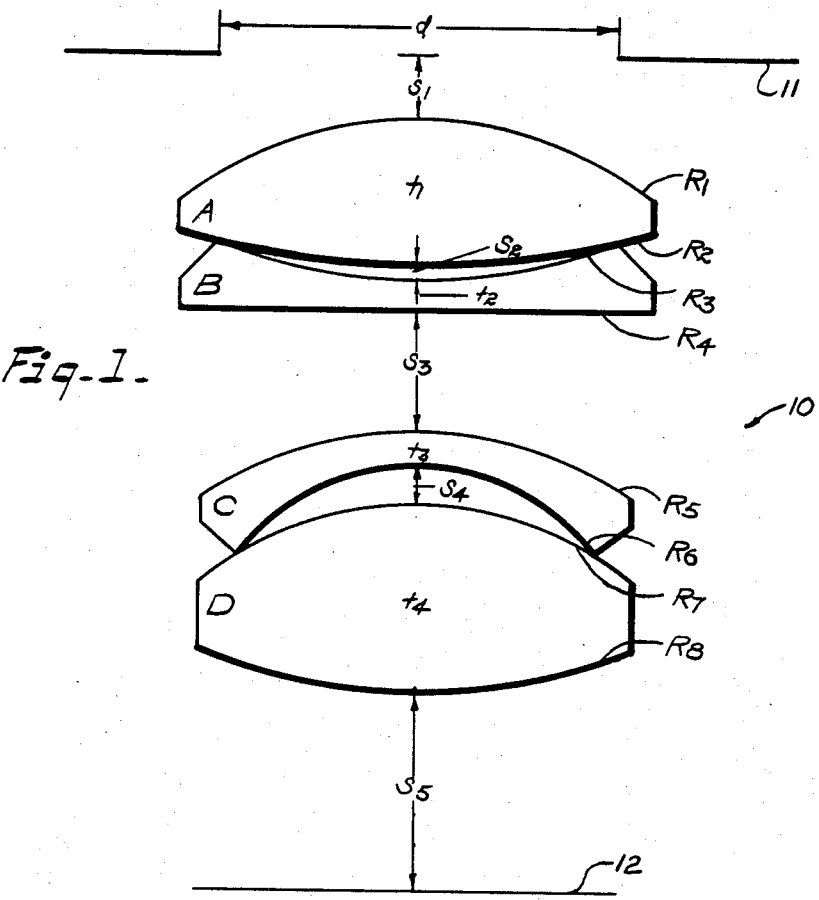

May 25, 1965     N. RICKLESS     3,185,032

MODIFIED PETZVAL TYPE PHOTOGRAPHIC OBJECTIVE

Filed Sept. 27, 1962

| LENS | RADII | THICKNESS | SPACES | $n_D$ | $\nu$ | FOCAL LENGTH |
|---|---|---|---|---|---|---|
| | E.F.L.= 13.17 mm | | B.Fl.= 5.20 mm | | f/1.2 | |
| A | $R_1$=10.375<br>$R_2$=26.061 | $t_1$=3.68 | $S_1$=1.5<br>$S_2$=.295 | 1.691 | 54.8 | $F_A$=10.739 |
| B | $R_3$=17.701<br>$R_4$=∞ | $t_2$=.83 | $S_3$=3.60 | 1.867 | 31.0 | $F_B$=20.417 |
| C | $R_5$=10.185<br>$R_6$=5.861 | $t_3$=.98 | $S_4$=1.00 | 1.867 | 31.0 | $F_C$=-15.924 |
| D | $R_7$=8.790<br>$R_8$=10.365 | $t_4$=4.610 | $S_5$=5.20<br>$d$=10.98 | 1.691 | 54.8 | $F_D$=5.945 |

INVENTOR.
NATHAN RICKLESS

BY Frank C. Parker

ATTORNEY

United States Patent Office

3,185,032
Patented May 25, 1965

3,185,032
MODIFIED PETZVAL TYPE PHOTOGRAPHIC
OBJECTIVE
Nathan Rickless, Brighton, N.Y., assignor to Bausch &
Lomb Incorporated, Rochester, N.Y., a corporation of
New York
Filed Sept. 27, 1962, Ser. No. 226,537
4 Claims. (Cl. 88—57)

The present invention relates to a photographic objective of the modified Petzval type having a large relative aperture and relates more particularly to improvements in such objectives.

It is an object of the present invention to provide a novel photographic objective having a relative aperture as large as $f/1.2$ particularly for use in 8 mm. cameras, said objective being corrected in a superior manner for spherical and chromatic aberrations, coma, astigmatism and field curvature while being of low cost and simple construction.

Further objects and advantages of this invention will be found by those skilled in this art in the constructional details as set forth in the specification herebelow taken together with the accompanying drawing wherein, FIG. 1 is an optical diagram showing one form of an objective constructed according to this invention, and FIG. 2 is a chart of constructional data related to said objective.

An objective of the above mentioned type having an unusually large relative aperture as large as $f/1.2$ is designated by the numeral 10 in the drawing, the objective being provided with a diaphragm 11 located in front of said objective, said objective forming an image rearwardly thereof at an image plane 12.

Said objective is composed of a front group of lenses including a positive double convex singlet lens A in contact with a negative rear plano concave singlet lens B, and an optically aligned rear lens group which is air-spaced from the front group and includes a negative meniscus singlet lens C which is in contact with a positive rear double convex lens D. The concave side of each said negative lens faces the adjoining positive lens. Axial airspaces $S_2$ and $S_4$ are provided between lenses A and B, and between lenses C and D respectively as hereinafter specified.

In order to achieve a superior correction of the spherical and chromatic image aberrations along with such conditions as coma, astigmatism and field curvature in an objective of such a large relative aperture as $f/1.2$ the constructional data for the objective is specified in advantageous ranges of values in the table herebelow, wherein $F_A$ to $F_D$ denotes the individual focal lengths of the successive lenses A to D, $R_1$ to $R_8$ designates the radius of the successive lens surfaces and the accompanying minus (—) sign used with certain R values applies to radii whose centers of curvature lie to the left of the vertex of the surface as shown in the drawing, $t_1$ to $t_4$ are the successive axial thicknesses of said lenses, $S_1$ to $S_5$ designate the successive airspaces surrounding said lenses, and $n_D$ and $\nu$ represent the corresponding refractive index and Abbe number respectively of the glass from which the lenses are made, and F designates the equivalent focal length of said objective.

$F_A = .818F$
$-F_B = 1.550F$
$-F_C = 1.21F$ (negative power)
$F_D = .452F$
$.710F < R_1 < .868F$
$1.778F < R_2 < 2.172F$
$1.213F < -R_3 < 1.503F$
$R_4 > \pm F$
$.699F < R_5 < .853F$
$.402F < R_6 < .490F$
$.600F < R_7 < .732F$
$1.256F < -R_8 < 1.534F$
$.241F < t_1 < .307F$
$.0569F < t_2 < .0695F$
$.0669F < t_3 < .0817F$
$.215F < t_4 < .385F$
$.103F < S_1 < .125F$
$.0202F < S_2 < .0246$
$.246\ F < S_3 < .300F$
$.0686F < S_4 < .0838F$
$.356F < S_5 < .434F$
$1.685 < n_D(A) < 1.710$
$1.860 < n_D(B) < 1.875$
$1.860 < n_D(C) < 1.875$
$1.685 < n_D(D) < 1.710$
$50.0 < \nu(A) < 60.0$
$25.0 < \nu(B) < 37.0$
$25.0 < \nu(C) < 37.0$
$50.0 < \nu(D) < 60.0$ A more specific statement of the constructional data for one form of objective according to the present invention is given in the table herebelow wherein the designations have the same meaning as given in the table hereabove.

$R_1 = .789F$
$-R_2 = 1.975F$
$-R_3 = 1.348F$
$R_4 = \infty$
$R_5 = .776F$
$R_6 = .446F$
$R_7 = .666F$
$-R_8 = 1.395F$
$t_1 = .279F$
$t_2 = .0632F$
$t_3 = .0743F$
$t_4 = .350F$
$S_1 = .114F$
$S_2 = .0224F$
$S_3 = .273F$
$S_4 = .0762F$
$S_5 = .395F$ (back focal length)
$n_D\ (A) = 1.691$
$n_D\ (B) = 1.867$
$n_D\ (C) = 1.867$
$n_D\ (D) = 1.691$
$\nu\ (A) = 54.8$
$\nu\ (B) = 31.0$
$\nu\ (C) = 31.0$
$\nu\ (D) = 54.8$ A numerical example of one successful form of the present invention is given in the following chart of values, the designations used therein having the same meaning as given hereabove, and where E.F.L. and B.F.L. designate equivalent focal length and back focal length respectively.

[E.F.L.=13.17 mm.    B.F.L.=5.20    f/1.2]

| Lens | Radii | Focal length | Thicknesses | Spacings | $n_D$ | $\nu$ |
|---|---|---|---|---|---|---|
| A | $R_1=10.3753$ | $F_A=10.739$ | $t_1=3.68$ | $S_1=1.5$ | 1.691 | 54.8 |
|   | $-R_2=26.0615$ |   |   | $S_2=.295$ |   |   |
| B | $-R_3=17.7011$ | $-F_B=20.417$ | $t_2=.83$ |   | 1.867 | 31.0 |
|   | $R_4=\infty$ |   |   | $S_3=3.60$ |   |   |
| C | $R_5=10.1859$ | $-F_C=15.924$ | $t_3=.98$ |   | 1.867 | 31.0 |
|   | $R_6=5.8613$ |   |   | $S_4=1.00$ |   |   |
| D | $R_7=8.7902$ | $F_D=5.945$ | $t_4=4.61$ |   | 1.691 | 54.8 |
|   | $-R_8=18.3654$ |   |   | $S_5=5.20$ |   |   | wherein all scalar quantities are given in millimeters.

The aforesaid diaphragm 11 in this form of the invention has a diameter $d$ of substantially .715F and is located a distance $S_1$ ahead of lens A as given in the chart above.

Although only one specific form of the present invention is shown and described in detail, it will be understood that other forms are possible and may be made in all numerical specifications of the parameters of said objective without departing from the spirit of this invention as claimed herebelow.

I claim:

1. A photographic objective of modified Petzval type having a relative aperture as large as $f/1.2$ and being corrected in a superior manner for chromatic and spherical aberrations, coma, astigmatism and field curvature, said objective comprising a front group of lenses spaced from and optically aligned with a rear group of lenses and a diaphragm located in spaced relation to the object side of said front group, said front group including a double convex positive lens A in contact with the concave side of a rearward plano concave negative lens B, both lenses being singlets, said rear group including a negative meniscus lens C having a concave side in contact with a rearwardly located positive double convex lens D, both lenses being singlets, the values of radius for the successive lens surfaces $R_1$ to $R_8$ being given in the table of mathematical inequalities herebelow $.710F < R_1 < .868F$
$1.778F < -R_2 < 2.172F$
$1.213F < -R_3 < 1.503F$
$R_4 > \pm F$
$.699F < R_5 < .853F$
$.402F < R_6 < .490F$
$.600F < R_7 < .732F$
$1.256F < -R_8 < 1.534F$ wherein the minus (—) sign applies to radii whose centers of curvature lie to the left of the vertex of the surface as shown on the drawing, and F designates the equivalent focal length of said objective, the values of the successive lens thicknesses designated $t_1$ to $t_4$, and the successive axial lens spacings $S_1$ to $S_5$ between said diaphragm and the image plane of the objective being as specified in the table of mathematical statements herebelow, $.241F < t_1 < .307F$
$.0569F < t_2 < .0695F$
$.0669F < t_3 < .0817F$
$.215F < t_4 < .385F$
$.103F < S_1 < .125F$ $.0202F < S_2 < .0246F$
$.246F < S_3 < .300F$
$.0686F < S_4 < .0838F$
$.356F < S_5 < .434F$ the values of refractive index $n_D$ (A) to $n_D$ (D) and the values of Abbe number $\nu$ (A) to $\nu$ (D) for the glasses in the successive lenses A to D being specified in the table of mathematical statements herebelow.

$1.685 < n_D (A) < 1.710$
$1.860 < n_D (B) < 1.875$
$1.860 < n_D (C) < 1.875$
$1.685 < n_D (D) < 1.710$
$50.0 < \nu (A) < 60.0$
$25.0 < \nu (B) < 37.0$
$25.0 < \nu (C) < 37.0$
$50.0 < \nu (D) < 60.0$

2. A photographic objective of modified Petzval type having a relative aperture as large as $f/1.2$ and being corrected in a superior manner for chromatic and spherical aberrations, coma, astigmatism and field curvature, said objective comprising a front group of lenses spaced from and optically aligned with a rear group of lenses and a diaphragm located in spaced relation to the object side of said front group, said front group including a double convex positive lens A in contact with the concave side of a rearward plano concave negative lens B, both lenses being singlets.

said rear group including a negative meniscus lens C having a concave side in contact with a rearwardly located positive double convex lens D, both lenses being singlets, the values of radius for the successive lens surfaces $R_1$ to $R_8$ being given in the table of mathematical statements herebelow $R_1=.789F$
$-R_2=1.975F$
$-R_3=1.348F$
$R_4=\infty$
$R_5=.776F$
$R_6=.446F$
$R_7=.666F$
$-R_8=1.395F$ wherein the minus (—) sign applies to radii whose centers of curvature lie to the left of the vertex of the surface as shown in the drawing, F designates the equivalent focal length of said objective, the successive lens thicknesses designated $t_1$ to $t_4$, and the successive axial lens spacings $S_1$ to $S_5$ between said diaphragm and the image plane being specified in the table of mathematical statements herebelow, $t_1=.279F$
$t_2=.0632F$
$t_3=.0743F$
$t_4=.350F$
$S_1=.114F$
$S_2=.0224F$
$S_3=.273F$
$S_4=.0762F$
$S_5=.395F$ (back focal length)

the values of refractive index $n_D$ and Abbe number $\nu$ being stated in the table herebelow, $n_D (A)=1.691$
$n_D (B)=1.867$
$n_D (C)=1.867$
$n_D (D)=1.691$
$\nu (A)=54.8$
$\nu (B)=31.0$
$\nu (C)=31.0$
$\nu (D)=54.8$ 3. A photographic objective of modified Petzval type having a relative aperture as large as $f/1.2$ and being corrected in a superior manner for chromatic and spherical aberrations, coma, astigmatism and field curvature, said objective comprising a front group of lenses spaced from and optically aligned with a rear group of lenses and a diaphragm located in spaced relation to the object side of said front group, said front group including a double convex positive lens A in contact with the concave side of a rearward plano concave negative lens B, both lenses being singlets, said rear group including a negative meniscus lens C having a concave side in contact with a rearwardly located positive double convex lens D, both lenses being singlets, the constructional data for said objective being given in the chart of values herebelow wherein $R_1$ to $R_8$ designate the successive lens radii and the minus (—) sign applies to radii whose centers of curvature lie to the left of the vertex of the surface as shown in the drawing, $F_A$ to $F_D$ designate the focal lengths, $t_1$ to $t_4$ represents the successive lens thicknesses, $S_1$ to $S_5$ represents the successive axial airspaces between said diaphragm and the image produced by the objective, and $n_D$ and $\nu$ designate respectively the refractive index and Abbe number respectively of the glass from which the lenses are made, and E.F.L. and B.F.L. designate respectively equivalent focal length and back focal length

[E.F.L.=13.17 mm.    B.F.L.=5.20    $f/1.2$]

| Lens | Radii | Focal length | Thicknesses | Spacings | $n_D$ | $\nu$ |
|---|---|---|---|---|---|---|
|  |  |  |  | $S_1$=1.5 |  |  |
| A | $R_1$=10.3753 | $F_A$=10.739 | $t_1$=3.68 |  | 1.691 | 54.8 |
|  | $-R_2$=26.0615 |  |  | $S_2$=.295 |  |  |
|  | $-R_3$=17.7011 |  |  |  |  |  |
| B |  | $-F_B$=20.417 | $t_2$=.83 |  | 1.867 | 31.0 |
|  | $R_4$=∞ |  |  | $S_3$=3.60 |  |  |
|  | $R_5$=10.1859 |  |  |  |  |  |
| C | $R_6$=5.8613 | $-F_C$=15.924 | $t_3$=.98 |  | 1.867 | 31.0 |
|  |  |  |  | $S_4$=1.00 |  |  |
|  | $R_7$=8.7902 |  |  |  |  |  |
| D | $R_8$=18.3654 | $F_D$=5.945 | $t_4$=4.61 |  | 1.691 | 54.8 |
|  |  |  |  | $S_5$=5.20 |  |  | all scalar dimensions being stated in millimeter.

4. A photographic objective according to claim 3 further characterized by a diaphragm having a diameter of substantially .715F and located at a distance of .114F in front of the foremost lens surface.

References Cited by the Examiner

UNITED STATES PATENTS

| 873,896 | 12/07 | Rohr | 88—57 |
| 1,620,337 | 3/27 | Frederick et al. | 88—57 |
| 2,962,930 | 12/60 | Johnson | 88—57 |

FOREIGN PATENTS 105,269  9/38  Australia.

JEWELL H. PEDERSEN, *Primary Examiner.*

UNITED STATES PATENT OFFICE
CERTIFICATE OF CORRECTION

Patent No. 3,185,032                                                  May 25, 1965

Nathan Rickless

It is hereby certified that error appears in the above numbered patent requiring correction and that the said Letters Patent should read as corrected below.

Column 1, line 58, for "thickneses" read -- thicknesses --; column 2, line 6, for "$1.778F < R_2 < 2.172F$" read -- $1.778F < -R_2 < 2.172F$ --.

Signed and sealed this 14th day of December 1965.

(SEAL)
Attest:

ERNEST W. SWIDER                                      EDWARD J. BRENNER
Attesting Officer                                             Commissioner of Patents